Patented July 22, 1930

1,771,343

UNITED STATES PATENT OFFICE

AUGUST J. PACINI, OF CHICAGO, ILLINOIS, ASSIGNOR TO CHARLES M. RICHTER, OF CHICAGO, ILLINOIS

PRODUCTION OF ANTIRICKETIC SUBSTANCES

No Drawing.    Application filed December 10, 1927.   Serial No. 239,258.

This invention relates to anti-ricketic products and the like, and with regard to certain more specific features, to the assistance, promotion or catalysis of the synthesis and transmutation of anti-ricketic and similar substances. This invention is in part an improvement over the process set forth in applicant's Patent No. 1,681,120, issued August 14, 1928.

Among the several objects of the invention may be noted the treatment of substances which elaborate growth-producing substances, hereinafter for brevity termed vitamin $a$, to produce anti-ricketic substances which include the so-called vitamin D, without including the use of radiation of wave-length shorter than about 3022 Ångström units, together with a promoting or catalyzing means.

Another object of the invention is to provide catalysts as converting or synthesizing means of the class described, by which commercial production of anti-ricketic food and medicinal products may be more practically accomplished on a substantial scale of operations.

Another object of the invention is the provision of improved means of the class described for making concentrated water-soluble anti-ricketic medicinal and other products which include said vitamin D, from merely fat-soluble substances of a corresponding nature.

Another object of the invention is the production of water-soluble fractions adapted to be used hypodermically as anti-ricketic injections.

Other objects will be in part obvious and in part pointed out hereinafter.

The invention accordingly comprises the elements and combinations of elements, steps and sequence of steps, which will be exemplified in the articles hereinafter described, and the scope of the application of which will be indicated in the following claims.

It can be shown that certain growing, living things are apparently sources of a growth-producing substance, apparently related to but not identical to vitamin A, and hereinafter for brevity termed vitamin $a$. The more rapidly growing things, in general, appear to be good sources of this substance, as for example, typhoid bacilli cultures, rapidly growing sarcomata, certain of the fungi, certain of the ascomycetes and others. The various vitamins, under suitable methods of animal experimentation, in which proper adjustment of the inorganic portion of the diet is made, can be shown to accelerate growth. This growth producing property can be demonstrated for vitamin A, vitamin B and vitamin D. In addition to the growth-producing properties possessed by the classes of vitamins enumerated, the separate groups show other characteristics by which their distinction becomes possible. Thus, vitamin A is growth-producing, is also anti-xerophthalmic and is considered fat soluble. Vitamin B is growth producing, anti-beriberic, and water soluble. Vitamin D is growth producing, anti-ricketic and fat soluble. The classes of materials serving as sources for vitamin $a$ as the term is used in the present application are known to furnish water soluble vitamin B, but the presence of vitamin A, which is probably complex and consists at least of both a growth-producing and an anti-xerophthalmic fraction, has heretofore been considered absent, or present in scarcely appreciable amounts. The matter of the suitable extraction of the fat soluble vitamin A is acknowledged to be difficult, certain organic solvents being effective when used with one material and ineffective when used with another. This same difficulty is experienced with the substance designated vitamin $a$. Novel means for accomplishing extractions are given hereinafter.

For example, one of the fungi, Agaricus

*campestris* (ordinary meadow-agaric), may be used as a source of growth-producing material (vitamin *a*). For this purpose it is finely minced in its fresh state and extracted with a mixture of acetone and alcohol in the following proportions:

*Example 1*

Agaricus-campestris (fresh) ____ 2 kilograms
Extractant, absolute ethyl alcohol ____ 500 cc.
Acetone, C. P., free from methyl alcohol _____ 1000 cc.

The extraction is made by reflux at reduced pressure in a period of six hours. At the conclusion of the extraction, the solvent is decanted from the residue and is evaporated at reduced pressure in vacuum, whereby a fatty residue is obtained weighing of the order of 6.0 to 9.0 grams, depending upon the original moisture content of the *Agaricus campestris*. This residue is dissolved in absolute ethyl alcohol in proportions adapted to make a solution, each cubic centimeter of which contains 100 milligrams of residue. This alcoholic solution is then treated by shaking with fuller's earth in the ratio of one gram of fuller's earth per cubic centimeter of solution and the alcohol permitted to evaporate, thus distributing 100 milligrams of *Agaricus campestris* extract throughout one gram of fuller's earth.

The growth-producing, or inducing substance appears now to be transfixed to the fuller's earth, presumably by adhesion, thus affording a comparatively quantitative measure of effectiveness. The earth when fed to rats which have been placed on a growth-free diet, owing to lack of vitamin A, will increase in growth, thus demonstrating that a growth producing substance is present in the extract, this substance belonging presumably to the group of vitamins known as vitamin A. If the extraction is carried on with benzene instead of acetone and alcohol mixture, a larger amount of fatty residue is obtained, weighing of the order of 7.0 to 11.0 grams. Comparison of the residue obtained by the acetone-alcohol extraction with the residue obtained by the benzene extraction, both residues being fed to experimental rats kept on a diet adequate in every respect save for the absence of vitamin A, discloses considerable anti-xerophthalmic effect in the case of the benzene residue and a negligible anti-xerophthalmic effect in the case of the alcohol-acetone residue, growth producing properties being present in both instances. It thus appears that vitamin A may be composed of several growth-producing components, the anto-xerophthalmic effect belonging to one of these components, or comprising possibly a separate vitamin. As stated above, for brevity the growth-producing, fat soluble and apparently anti-xerophthalmic lacking substance will be identified by the special designation vitamin *a*.

The growing things mentioned above and others will produce similar extracts but they are not all equally potent, as the following table of approximations shows:

| Substance | Relative growth production power |
|---|---|
| 1. Typhoid bacilli | * |
| 2. Brown rot of peaches | * * |
| 3. Sarcomatous tissue | * * * |
| 4. *Agaricus campestris* | * * * * |
| 5. Ergot of rye | * * * * * |

As an example of the mode of forming another extract, the following short method is given:

*Example 2*

*Claviceps purpurea* (ergot of rye) is extracted with chloroform in the manner as set forth in Example 1. This extract is evaporated at reduced pressure and treated with alcoholic potash solution to saponify the saponifiable fats. These are removed, as by salting with calcium chloride, and the remaining filtrate evaporated to dryness. The result is a water-insoluble residue containing vitamin *a*.

The vitamin *a* extracts obtained from the substances named, that is, typhoid bacilli, *Agaricus campestris*, brown rot of peaches, sarcomatous tissue, ergot of rye, and undoubtedly to be obtained also from sources belonging to the classes of which the substances named are but class examples, have been found to be devoid of anti-ricketic property, and therefore, devoid of vitamins of the D group. One of the objects of invention is to endow the growth-producing quality of substances of the class above set forth, with an anti-ricketic property.

To accomplish the above end, the water-insoluble residues containing vitamin *a*, of the class above set forth, are irradiated by one of several methods, the method of irradiation being preferably characterized by an exclusion of those ultraviolet wave-lengths commonly designated as biologically active and such as are procured from a mercury vapor arc in quartz. By ultraviolet radiation is meant that radiation which lies outside of the visible spectrum at its violet end and starts at about 4000 Ångström units extending to the region of the X-ray from which ultraviolet radiation finally becomes inseparable. Converted to units of wave-length, this amounts to wave-lengths from 0.4 of a micron to the X-rays, generally considered as beginning somewhere around 0.05 microns, or, from 0.00004 of a centimeter to 0.000005 of a centimeter. It is understood that I intend to use radiation including wavelengths, such for example as the infra red. The salient point is that my method of irradiation preferably excludes biologically effective radiation such as is obtained from quartz mercury vapor lamps or from unfiltered sources of carbon arc lamps.

Biologically useful ultraviolet radiation is differently designated, the basis for the designation residing in the fact that ordinary window glass is considered opaque to the effective ultraviolet radiations. By effective ultraviolet radiation is meant here that region which is curative for rickets in animals and in humans, and which I have demonstrated, as have subsequently others, to include wavelengths beginning at about 3022 Ångström units and extending possibly as far as 2000 Ångström units (0.302 to 0.2 microns, or 0.0000302 to 0.00002 centimeters). Ordinary incandescent illuminating sources, such as tungsten filament lamps, or such as the incandescent arc lamp, commonly designated the Cooper-Hewitt work-light industrial units, emit ultraviolet radiation but inasmuch as their rays must pass through the thickness of the glass wall comprising the bulb in which the incandescence is struck, the shorter, biologically useful rays are obstructed. Such sources of radiation emitting small, sub-intensive amounts of glass filtered ultraviolet radiation are not considered sources of biologically or therapeutically active radiation in the art. Ultraviolet radiation as the phrase is often used means radiation of shorter wave-length than that filtered out by ordinary glass, and such as is obtained from a mercury vapor lamp in quartz, ordinary glass having the effect of removing the necessary radiation.

By radiation herein is meant electromagnetic radiation, as distinguished from corpuscular radiation.

Hereinafter, for the purpose of this invention and in keeping with the discoveries around which the nomenclature of the art is devised, biologically effective ultraviolet rays shall be considered as those comprised in the region included between 3022 Ångström units and 2000 Ångström units. All other wave lengths of ultraviolet shall be referred to as heretofore thought to be non-effective in the sense of rickets prevention and cure in animals and humans, and in the sense of vitamin transmutation and production as will be disclosed hereinafter.

When the extracted material is obtained, in the manner specified, from substances for which class examples have been set forth, I have discovered that the exposure of such material to certain radiations exclusive of the range which by common consent is defined as designating the biologically and therapeutically active ultraviolet radiation, occasions in the material an apparent conversion of fat soluble vitamin $a$ to fat soluble vitamin D, the growth producing properties of the vitamin $a$ are lost and become replaced by pronounced anti-ricketic vitamin D properties.

For example, the organic solvent extract of *Claviceps purpurea* loses its vitamin $a$ properties and acquires instead anti-ricketic vitamin D properties when exposed to radiation as follows:

Example 3

The organic vitamin A and vitamin $a$ extract is placed in a suitable glass dish, and is covered with a glass sheet. It is exposed to the dominantly blue-rich radiation from the Cooper-Hewitt work-light lamp operating on 110 volts direct current main. The lamp is supported ten inches above the fatty extract. The exposure is continued for two hours. It is not necessary that the glass cover be placed over the dish inasmuch as the lamp already is enclosed in ordinary glass. Any open receptacle serves just as well. The use of the glass covered receptacle simply establishes again the effectiveness of radiations heretofore described as inoperative in similar biological or therapeutic practices.

The same result is procured if quartz mercury vapor lamps are used in place of the Cooper-Hewitt work-lights, there being interposed a sheet of ordinary window glass in the path of the rays before they reach the fatty extract.

It appears to be a prime requisite that the light used contain wave-lengths readily absorbed by the material to be activated. In proportion as the material to be activated is pure white in color, its ability to absorb radiations in any part of the visible spectrum is increasingly lessened, and in such instances, other parts of the spectra must be used. I have found that pure white materials, or materials subject to activation approaching whiteness, show absorption in the ultraviolent region sometimes coincident with the region used biologically and therapeutically; but I have also discovered that there is a similar absorption of wave-lengths in still another region of the spectrum commonly designated as infra-red, and that absorption of these wave-lengths by the vitamin A and vitamin $a$ material, as well as absorption by materials subject to activation which do not originally contain either vitamin A or vitamin $a$, results in the appearance of vitamin D reacting substances in the material.

Example 4

Ordinary cholesterol, which contains neither vitamin A nor vitamin $a$, exposed to infra red radiations longer than 9000 Ångström units, and not glass filtered, suffers modifications in due time revealed by the following changes; a lowering in the melting point, a tendency to change color passing from pure white to cream-yellow or deeper, a change in solubility in organic solvents, no change in empiric constitution, a change in its reaction towards certain reagents (such as freshly distilled aniline 15 parts mixed with 1 part of pure hydrochloric acid, with which reagent unaltered cholesterol gives no color on boiling, but activated cholesterol produces a Burgundy red color indicative of a change), and finally, that the cholesterol, previously incapable of serving as an anti-ricketic becomes powerfully anti-ricketic, depending upon the factors of exposure.

A similar transmutation is observed in the case of the fatty extracts, obtained as mentioned previously in this invention, takes place upon exposure to infra-red radiation, as is indicated in the next example:

*Example 5*

The fatty extract obtained as heretofore described from *Agaricus campestris*, or brown rot of peaches, or *Claviceps purpurea*, or typhoid bacilli, exposed to infra red radiation such as is obtained from a source commonly designated zoalite in the trade, suffers a loss in its vitamin A and vitamin $a$ content which becomes replaced apparently quantitatively by vitamin D, as if the A and $a$ vitamins had been transmuted into vitamin D.

It is to be noted that the previous extraction of the fatty substances which are later subjected to activation is made for the purpose of obtaining a concentrate which may serve the purpose of medicinal or the purpose of a rich supply of vitamin D for addition to vitamin D lacking foodstuffs or other desirable uses, and that the previous extraction need not be resorted to in the case of such things as contain the fatty extractives in their natural state. In these cases it is only necessary to expose the material carrying the fatty extractive naturally to proper infra red radiation to achieve activation of the material, as is indicated in the accompanying example.

*Example 6*

Corn oil, linseed oil, peanut oil, other seed oils; various cereal products including rolled oats, corn flakes, bran flakes and co-related foods; cocoa-butter, either alone or in chocolate; dried milk; and a variety of other similar foodstuffs, I have discovered, can be made to acquire vitamin D activity if they are suitably exposed to radiations which each material is shown to absorb best, such for example as infra red rays in the region mentioned.

It is to be noted further that there are several methods of supplying infra red rays to a material which is to be activated. The one, already described, consists in exposing the substance to a black body of radiating material descriptive of which was mentioned the zoalite infra red generator. Another method consists in bringing the material which lends itself to such treatment to a Kelvin temperature which will itself assure the presence of adequate radiation wave-lengths, and which may be reached merely by heating the material in any suitable receptacle.

*Example 7*

Cholesterol, ergosterol, or the fatty extract of purpurea may be placed in an ordinary test tube and brought quickly to its fusion temperature without charring or otherwise decomposing the material. Almost instantly the change takes place, the cholesterol, for example, suffering all of the changes as listed under Example 4 and acquiring anti-ricketic properties.

Unless a threshold of intensity capable of activation is furnished and maintained, the material does not appear to acquire the vitamin D property, or if it does acquire it, the time necessary to develop the property is immeasurably prolonged. Also, if the activation is prolonged beyond a reasonable time determined by experience in the case of each material, the threshold of intensity being proper, the vitamin D generated is dissipated. Materials once over-activated cannot again be activated until they have first been recrystallized from suitable solvents, thus reaching their original stereometric configuration from which all activating processes start.

It has already been noted that the activation is brought about by wave-lengths of radiation which the material being subjected to the process will absorb. A preliminary spectrographic survey usually furnishes evidence suggesting the appropriate wave-lengths. It is evident that different wave-lengths bring different amounts of energy per gram molecule of reacting substance; therefore, in modifying the process of activation through the use of various wave-lengths, it is desirable that the different radiations be furnished in equivalent intensities and, quite as desirable, in equivalent photochemical amounts. Thus, I have discovered that at wave-length 3300 Ångström units (not in the biologically effective region), the desired transmutation can be achieved in the case of the fatty extract obtained from *Claviceps purpurea*. If it is desired to replace this radiation with one of longer wave-length, say infra red, two considerations must be fulfilled. The longer radiations must be absorbed and will lie in the region greater than 12,000 Ångström units. These infra red radiations must be furnished in intensity equal to that used in the case of the light at 3300 Ångström units; and then, the exposure must be prolonged to compensate for the lessened energy-value of longer waves.

I have discovered further that the activation can be produced much more satisfactorily if the radiation used is monochromatic in the region absorbed by the material. To secure relatively monochromatic sources of light resort may be had to the usual physical methods, which include the use of adequate filters; the spectral resolution of light by prismatic analysis; the use of circularly polarized light and similar devices. A method of filtration consists in the use of specially prepared glasses, colored or otherwise made opaque to the undesirable radiations, including the undesirable biologically effective ultraviolet rays. Other methods of filtration may be used, as through the use of colored solutions, dyes, organic and inorganic, dissolved in water or other adequate solvents, such as picric acid in water, cobaltous chloride in acetone and the like. The spectral resolution of light consists in the employment of a prism which separates the component spectral regions, thereafter permitting the desired spectral regions alone to affect the material. Monochromatic sources of light are also useful, as for example the neon glow lamp made incandescent by high frequency currents, as well as other gases similarly made to luminesce under adequate high tension discharge or made to glow by any other method. Tungsten filament lamps may be used as may also carbon arc lamps, Cooper-Hewitt work lamps, mercury vapor lamps in quartz, providing the biologically effective ultraviolet rays are first eliminated before the remaining radiation reaches the material to be activated.

I wish to point out here that the primary point is that I am able to take substances either originally growth-producing or not, and by means of rays more desirable than the biologically designated ultraviolet rays, cause a production of a substance anti-ricketic and rich in vitamin D, at the same time reducing the original growth-producing principle. It is to be understood that sunlight can accomplish the same end, but it is slow in its action and inconstant in its available form. Hence, artificial lighting methods are to include such as cause a concentration of sunlight beyond its ordinary powers, whereby its efficacious action is increased for the purpose in hand. Examples would include concentrating, refracting lenses and reflecting mirrors. However, in all such cases, as has been stated above, the biologically effective ultraviolet rays are preferably to be screened out.

Activation, I have discovered, can be effected also with rays not ordinarily included in the electro-magnetic spectrum, an example of which would include the cathode rays.

*Example 8*

Fatty extracts, obtained as above described, or materials containing activatable substances are exposed to the cathode rays as generated by whatever manner. For example, I have discovered activating ability in cathode rays generated by means of an ordinary Lenard tube, or any adequate equivalent of this tube, in which a high tension current passes from one electrode to the other and the cathode rays are then allowed to pass through any adequate metallic window in the tube. Further, the cathode rays can be obtained indirectly, as through the use of X-rays which are caused to bombard any suitable material known to give off cathode rays under this treatment, or cathode rays obtained from naturally radioactive substances, such as thorium, radium, uranium and similar materials, can be used. However generated, cathode rays, I have found, produce the desired activation in fatty extracts of the materials as well as in the materials themselves.

It is to be understood that other than fatty materials can also be made anti-ricketic, as for example the amino acid tyrosine; and that the activation is engendered by any of the methods as set forth above and in the examples. It appears that vitamin D is not a separate and isolatable material, but rather a property conferred upon various atomic groupings in which asymmetric carbon atoms, ethylene linkages and carbo-hydroxyl radicles are present. The most plausible explanation resides in looking upon vitamin D as an isomeride of certain atomic groupings, the isomeric transmutation being effected by the various means, heat, infra red rays, cathode rays, non-biologically effective ultraviolet rays and similar methods herein described, or in the material itself without previous extraction.

The term "sterol" is used in this application as covering all activatable substances such as set out above, such as cholesterol, ergosterol, and the like.

The reason for treating the growth-producing and other substances with radiations of wave lengths which exclude the ultraviolet of biologic action is that a greater amount of material may be treated at one time without the use of expensive apparatus and impractical equipment, such as is required when biologically effective ultraviolet rays are used. Heretofore, treatments have been made on the assumption that the biologically active ultraviolet rays are the only rays capable of accomplishing the desired end, but I have discovered that other rays have also the desired effect and that the same end can be accomplished more expeditiously therewith. For instance, some of the known ways of producing ultraviolet rays are by means of the quartz mercury vapor lamps, which are expensive, subject to rapid deterioration and inconvenient as well as harmful devices to operate where commercial operations are to be carried on.

Another point with regard to treatment of substances by ultraviolet rays is to be noted. If food or the like is exposed to these rays for purposes corresponding to the above, especially after inadvertent over-exposure has been made, it has been found that an undesirable bleaching result is had, as well as an undesirable change in the odor and flavor of the material treated which in many cases renders the food and the like impalatable and distasteful. Treatment with other than biologically active ultraviolet rays is not conducive to these definitely undesirable changes.

It is another primary object of this invention to provide means whereby non-biologically active ultraviolet rays can produce photochemical changes of the type described through the agency of catalyzing materials.

I have found that halogens such as chlorine and bromine, iron salts, uranium salts, certain organic dye stuffs, titanium salts, ozone, as well as several other substances, serve to speed up the reactions of both classes to a more marked degree. To illustrate the use of these catalysts the following example is given.

Example 9

Fatty extracts, or cholesterol, or tyrosine, or ergosterol, or the original foodstuff containing the appropriate activating material is placed in an ordinary glass tube, sealed and exposed to ordinary glass filtered day light. No change takes place excepting after several months of inclosure, when slight traces of activated vitamin D-like materials are developed. But if now the same or a similar preparation be made, including some chlorine or other catalyst in the tube, and then be exposed to an ordinary incandescent lamp, in very few minutes the change has taken place and an abundant supply of vitamin D-like material appears in the tube. The quantity produced appears to depend upon the time of exposure and the intensity of the light, as well as the wave-length of the radiation used.

It is supposed that the presence of the catalyst operates in probably one of two ways. The catalyst absorbs radiation of a wavelength which would not ordinarily be absorbed by the material, but which is effective in producing vitamin D, and then transfers its radiation to the material which in turn becomes active. Chlorine used as a catalyst makes ordinary blue-rich light sources, such as the Cooper-Hewitt work-light, exceedingly efficient as activating sources of radiation. The photo-catalysts to be used vary with the reactions and raw materials used, their choice being governed by experiment.

The term "suitable catalyst" is therefore to be understood hereinafter as meaning a catalyst of the type described; namely, a catalyst that is capable of absorbing rays of the types herein mentioned and transferring the action of said rays to the material to be activated.

Or the catalyst may act by its presence, not entering into the reaction, excepting to provide an energizing electron for which catalysts of the type mentioned are readily to be found.

It is to be understood that the catalyst may be placed with the material and left there after activation, or removed, at the will of the operator.

Another object of this invention is to provide vitamin D substances in water soluble form, so that preparations made therefrom may be more conveniently used as medicinals, in liquid form, powder or tablet, or for any purpose requiring water soluble vitamin D.

Fatty residues may be converted into water soluble materials if the residue is separated into its non-saponifiable component wherein the vitamin D most abundantly resides. That is, fatty extracts are divided by treatment with alcoholic potash solutions into a saponifiable and non-saponifiable fractions. The non-saponifiable fraction is then further fractioned into glucoside precipitable, and glucoside non-precipitable fractions. A suitable glucoside for this purpose is digitonin or saponin. The glucoside non-precipitable fraction is then exposed to any adequate radiation of the non-biologic ultraviolet range, as for example infra red or cathode rays or the like, described in the several examples herein already enumerated. This active residue is now brought into solution with various salts derived from the bile acids, as for example:

Example 10

The non-saponifiable, non-saponin precipitable extract from *Claviceps purpurea* is treated with rays from the Cooper-Hewitt work light lamp at a distance of ten inches for two hours, the lamp operating at about 350 to 400 watts. The activated residue thus obtained is taken up with a solution containing:

Sodium taurocholate _____ 1 part
Sodium glycocholate _____ 3 parts
Water _____ 6 parts The treatment is a digestion and may be effected in a sealed glass tube immersed in boiling water about eight hours, more or less. A dark brown solution containing a whitish sediment results. At the conclusion of the digestion, the solution is filtered and evaporated to dryness at reduced pressure. The residue is then dissolved in ethyl alcohol, gentle heating aiding in the solution. Neutral lead acetate is added to the alcoholic solution, thus precipitating the lead glycocholate. This precipitate is removed by filtration and the solution made alkaline with a slight excess of ammonia. Basic lead acetate and ammonia are then added to the solution, which precipitates the taurocholate. This is removed by filtration. All excess of lead is removed through the use of sulphuretted hydrogen after first making the solution slightly acid to litmus with hydrochloric acid. The lead separates out. It is filtered off and the remaining solution is evaporated to dryness. The residue thus obtained is water soluble and is strongly anti-ricketic. It is understood that other substances may be used to accomplish the result having the properties of sodium taurocholate and glycocholate.

The water-soluble fractions, obtained by the methods above set out for making an anti-ricketic medicinal product, instead of being evaporated, may be used in solution as medicinals for the hypodermic injection of anti-ricketic product. Injections containing the equivalent of 2000 milligrams of material in solution may be injected without the slightest deleterious effect upon animals and humans.

Other water soluble anti-ricketic products may be made by the treatment of the proper atomic orientations, such as occur for example in tyrosine, the original material being in itself soluble in water upon the faintest addition of suitable alkali.

*Example 11*

Tyrosine is made anti-ricketic by any of the methods herein described. The anti-ricketic product is dissolved in water containing sodium bicarbonate sufficient to effect complete solution.

It would appear that watery solutions of anti-ricketic products do not remain permanently anti-ricketic, the solution favoring an isomeric return to inactive forms of the double linkage, carbohydroxyl and alcoholic radicles which seemingly play a part in the isomeric transmutation. It is because of this reversion that vitamin D is probably not considered water soluble, solutions in oil or fat being much more stable.

Having described the details of the method for making the above conversions and transmutations, the following is to be made clear.

Foods are rendered anti-ricketic. either by applying the growth-producing substances or like substances to the food by wet or dry mixing and then exposing the thus treated food to cathode rays, or to non-biologically effective ultraviolet rays, or to infra red rays, or to monochromatic lights of suitable wavelength, or to any indirect method of insuring the immersion of the system in its proper radiation environment necessary to effect isomeric transmutation, either alone or through the use of catalysts. Or the substances may be first rendered anti-ricketic and then applied to the foods by wet or dry mixing, or the food may be exposed directly without previous admixture of any sort, as in the case of seed oils, cereals, and the like. Mixing may be accomplished mechanically or otherwise.

Taking for example oats, they are impregnated with the growth-producing substance (in extract or other form) and then exposed to the non-biologically active ultraviolet rays by continuous passage on belts or the like under suitable radiation generators. Or they are impregnated with a substance which has been previously rendered anti-ricketic by exposure to said rays or, they are exposed directly to the appropriate radiation other than biologically active ultraviolet rays.

Catalysis or the like is effected during exposure to the light and it is understood that so far as the catalytic or like phenomenon is concerned, that it is also applicable where ultraviolet exposures are used.

The same variations of method hold with respect to the manufacture of medicinal products, although the direct methods, hereinbefore described, are preferable in the case of the manufacture of said medicinal products.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The process of intensifying the activation of vitamin D comprising treatment of sterols with radiation in the presence of a suitable photocatalyst.

2. The method of actuating synthesis of vitamins comprising irradiating materials including said vitamins in the presence of a halogen.

3. The method of preparing sterols so that said sterols become anti-ricketic, said method comprising the application of rays longer than about 3022 Ångström units to sterols that absorb the rays so applied.

4. The process of intensifying the activation of vitamin D comprising treatment with radiation in the presence of a suitable catalyst, said catalyst being placed with the material carrying the vitamin.

5. The method of producing anti-ricketic substances comprising treating sterols with electromagnetic radiation in the presence of a suitable catalyst.

In testimony whereof, I have signed my name to this specification this 7th day of December, 1927.

AUGUST J. PACINI.